A. H. EHLE.
QUILL DRIVE FOR ELECTRIC LOCOMOTIVES.
APPLICATION FILED MAY 25, 1922.
1,435,056.
Patented Nov. 7, 1922.
2 SHEETS—SHEET 2.
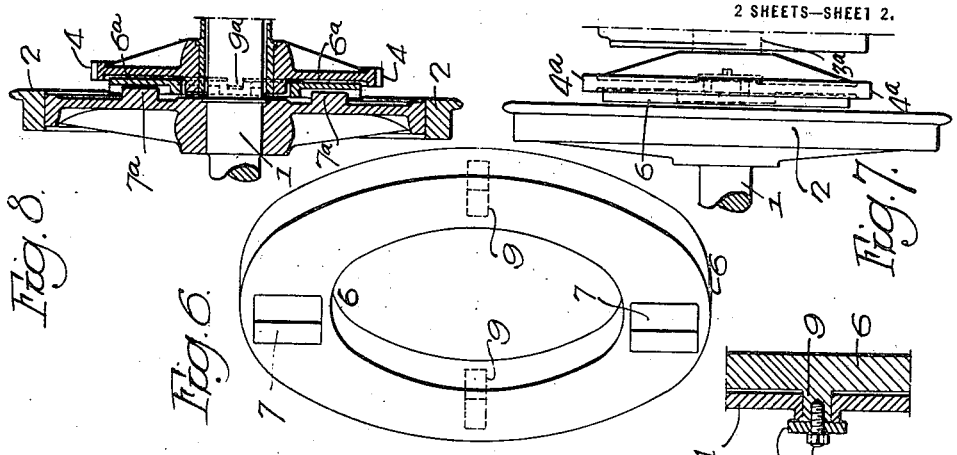
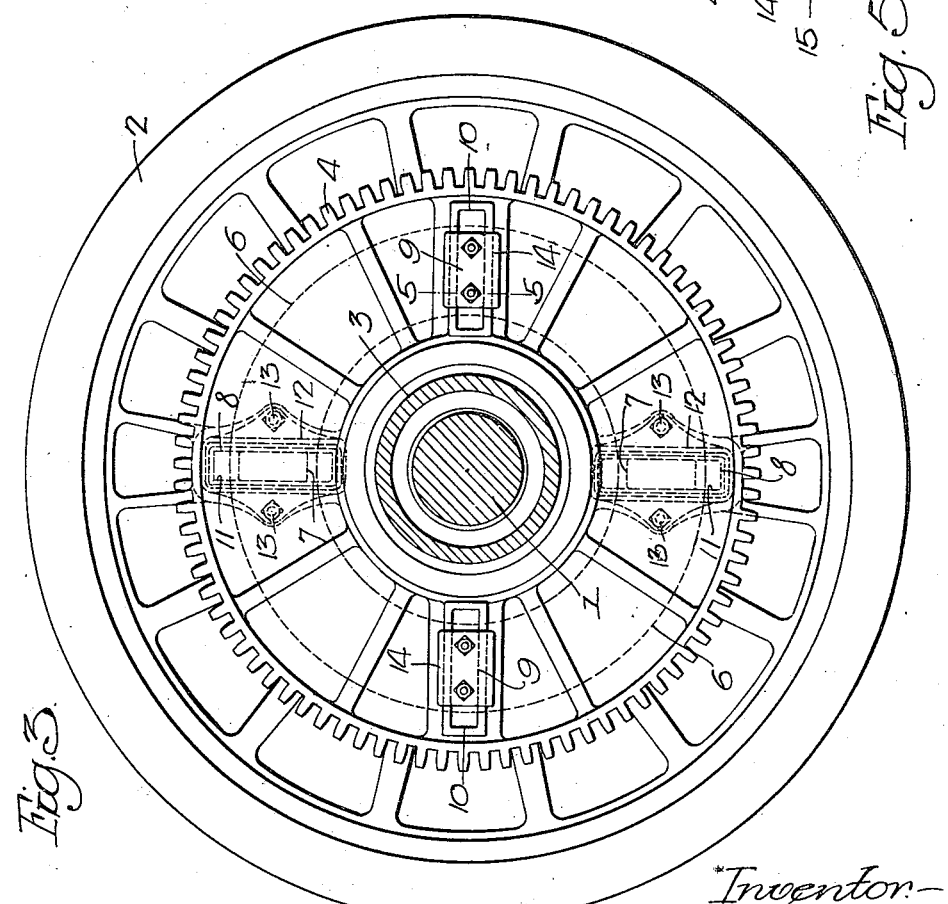
Inventor—
Archibald H. Ehle.
by his Attorneys.
Howson & Howson Patented Nov. 7, 1922.

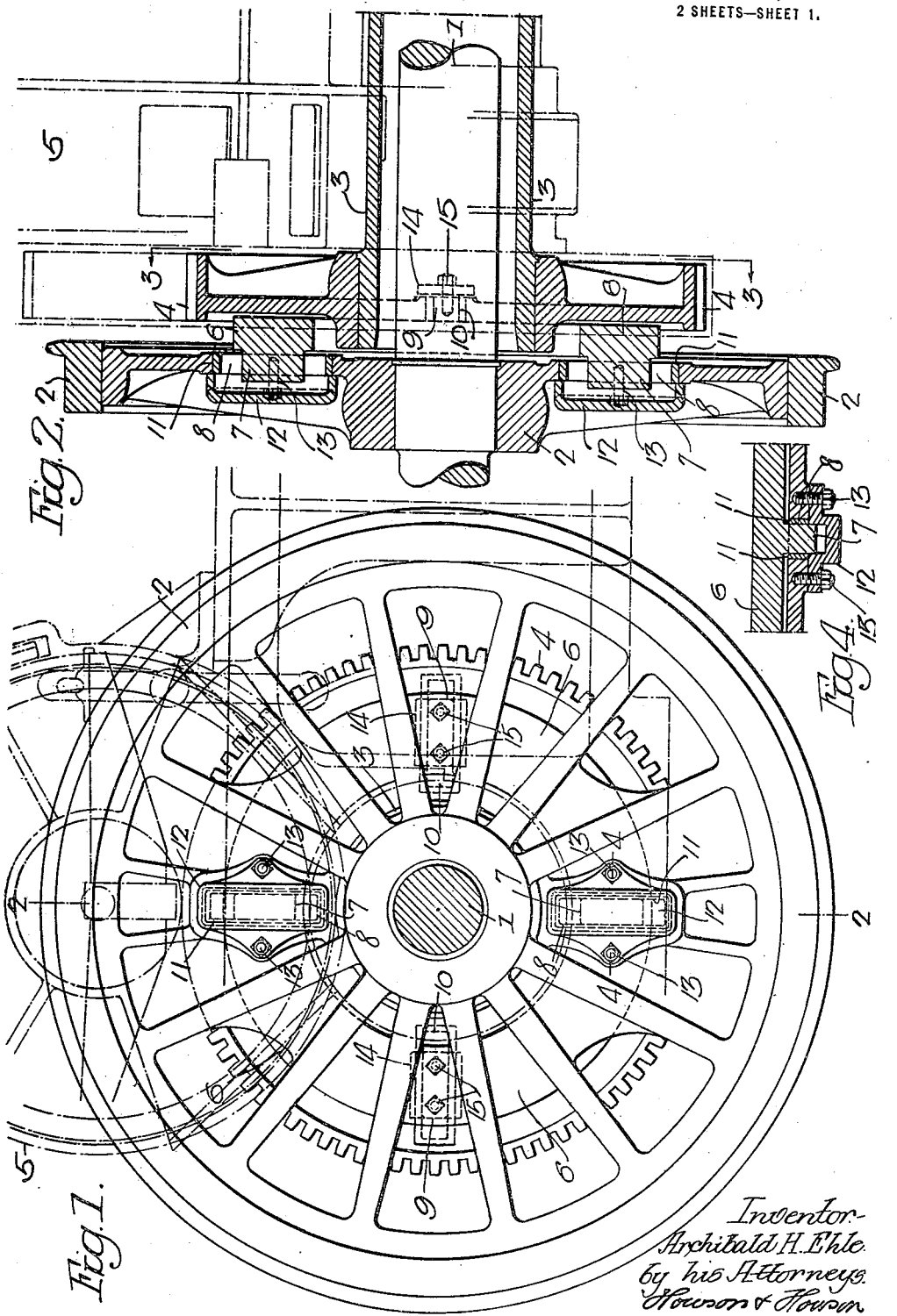

1,435,056

UNITED STATES PATENT OFFICE.

ARCHIBALD H. EHLE, OF MERION, PENNSYLVANIA, ASSIGNOR TO THE BALDWIN LOCOMOTIVE WORKS, OF PHILADELPHIA, PENNSYLVANIA, A CORPORATION OF PENNSYLVANIA.

QUILL DRIVE FOR ELECTRIC LOCOMOTIVES.

Application filed May 25, 1922. Serial No. 563,576.

*To all whom it may concern:*

Be it known that I, ARCHIBALD H. EHLE, a citizen of the United States, residing in Merion, Montgomery County, Pennsylvania, have invented certain Improvements in Quill Drives for Electric Locomotives, of which the following is a specification.

My invention relates to certain improvements in quill driving mechanism for locomotives, in which the motor is carried by a quill, or tubular shaft, through which the axle extends, the opening in the quill being of sufficient size to allow the frame of the locomotive to move vertically, independently of the axle.

The object of the present invention is to simplify the construction of the driving mechanism between the quill and the driving wheel of the locomotive.

This object I attain in the following manner, reference being had to the accompanying drawings, in which:

Fig. 1 is a side view, partly in section, of the driving wheel of an electric locomotive, showing the driving mechanism, the frame being illustrated by dotted lines;

Fig. 2 is a sectional view on the line 2—2, Fig. 1, illustrating the motor in dotted lines;

Fig. 3 is a sectional view on the line 3—3, Fig. 2;

Fig. 4 is a sectional view on the line 4—4, Fig. 1;

Fig. 5 is a sectional view on the line 5—5, Fig. 3;

Fig. 6 is a detached perspective view of the coupling member;

Fig. 7 is a view showing a concentrically mounted motor; and

Fig. 8 is a view illustrating a modification of the invention.

Referring to the drawings, 1 is the axle of an electric locomotive. Secured to this axle is a driving wheel 2. 3 is a quill, which surrounds the axle. This quill extends from one side of the locomotive to the other. The opening in the quill is much larger than the axle so that the quill is free to move independently of the axle. Secured to the quill is a gear wheel 4, Figs. 1 and 2, which is driven from a pinion on the electric motor 5, shown by dotted lines in Fig. 2. 6 is a coupling member, which has two projections 7 that extend into slots in the driving wheel 8, and two projections 9 that extend into slots 10 in the web of the gear wheel 4. The projections 9 are at right angles to the projections 7. This coupling member is in the form of a ring having an opening much larger than the hub of the gear wheel 4, which extends into the opening, as clearly shown in Fig. 2, so that, while the driving wheel is driven from the gear wheel 4 through the coupling member, the coupling member is constructed so as to allow freedom of movement of one part in respect to the other part.

The opening 8 in the driving wheel is preferably bushed with a lining 11, as shown in Fig. 2, and is closed by a cap plate 12 secured to the face of the wheel by bolts 13. The projections 9, which extend into the slot in the gear wheel 4, have attached thereto cap plates 14, which extend over the edges of the slot, as clearly shown in Fig. 5, the plates being held in place by bolts 15.

It will be seen by the above construction that a simple and practical method of flexibly coupling a driving wheel to the driving gear wheel, which is mounted on the quill of the electric locomotive, is obtained.

In Fig. 7, a construction is illustrated in which the electric motor is mounted concentrically on the quill 3ª and a balance wheel 4ª is secured to the quill. The coupling members engage the balance wheel.

In Fig. 8 a modification is illustrated, in which the projections 7ª and 9ª are on the driving wheel and the gear wheel, respectively. The coupling member 6ª is slotted for the reception of these projections.

I claim:

1. The combination of an axle; a quill through which the axle extends; a member mounted on the quill; a driving wheel mounted on the axle; a coupling member located between the quill member and the driving wheel; a sliding connection between the coupling member and the quill member; and a sliding connection between the coupling member and the driving wheel, one sliding connection being at right angles to the other sliding connection so as to allow the quill to move vertically, independently of the driving wheel.

2. The combination in a quill drive of an electric locomotive, of an axle; a driving wheel thereon; a member mounted on the quill; and a coupling member located between the quill member and the driving wheel, the quill member and the driving wheel being slotted, the slot in the quill member being at right angles to the slot in the driving wheel, the coupling member having two projections adapted to the slots.

3. The combination of an axle; a driving wheel mounted thereon; a quill through which the axle extends; a gear wheel on the quill; and a coupling member located between the gear wheel and the driving member, said coupling member having two projections on one side and two projections on the opposite side, the projections on one side being at right angles to the projections on the opposite side, the driving wheel and the gear wheel having slots into which the projections extend so that, while the driving wheel is driven positively from the gear wheel, the gear wheel and its quill are free to move vertically, independently of the axle.

4. The combination in a quill drive for electric locomotives, of an axle; a driving wheel thereon; a quill surrounding the axle; a wheel on the quill; a motor for driving the quill wheel; a coupling member located between the quill wheel and the driving wheel and having a central opening larger than the hub of the quill wheel and also having two projections on one side and two projections on the opposite side at right angles to each other, the quill wheel being slotted to receive two of said projections; cap plates secured to each projection and extending over the sides of the slots in the quill wheel; and cap plates covering the slots in the driving wheel.

ARCHIBALD H. EHLE.